United States Patent [19]

Borgstrom

[11] 4,140,899

[45] Feb. 20, 1979

[54] RECORDING DISTANCE MEASURING INSTRUMENT ATTACHED TO A VEHICLE HUB

[75] Inventor: Lennart Borgstrom, Svangsta, Sweden

[73] Assignee: Record Taxameter AB, Halmstad, Sweden

[21] Appl. No.: 747,977

[22] Filed: Dec. 6, 1976

Related U.S. Application Data

[63] Continuation-in-part of Ser. No. 612,208, Sep. 10, 1975.

[30] Foreign Application Priority Data

Feb. 24, 1975 [SE] Sweden .............................. 7502009
Feb. 19, 1976 [SE] Sweden .............................. 7601903

[51] Int. Cl.² ........................ G01C 22/00; G06C 7/10
[52] U.S. Cl. .............................. 235/95 C; 235/117 R; 235/133 R; 235/139 R
[58] Field of Search ..................... 235/96, 95 R, 95 C, 235/117 R, 103, 139, 133 R

[56] References Cited

U.S. PATENT DOCUMENTS

| | | | |
|---|---|---|---|
| 3,333,768 | 8/1967 | Powell | 235/96 |
| 3,337,129 | 8/1967 | Johnson | 235/95 R |

FOREIGN PATENT DOCUMENTS 1240406  7/1960  France ....................... 235/96

*Primary Examiner*—Stephen J. Tomsky
*Attorney, Agent, or Firm*—Sherman & Shalloway

[57] ABSTRACT

A distance measuring meter includes counting wheels which are indexed by transfer pinions mounted on an axle parallel to the axis of the counting wheels. In order to prevent fraud by rotating the counting wheels back so as to decrease the distance displayed, one end of the axle is detachably secured. When an attempt is made to rotate the counting wheels back, the axle detaches at one end, thereby indicating that the meter has been tampered with.

5 Claims, 9 Drawing Figures

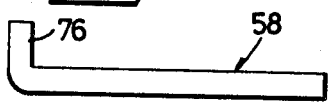
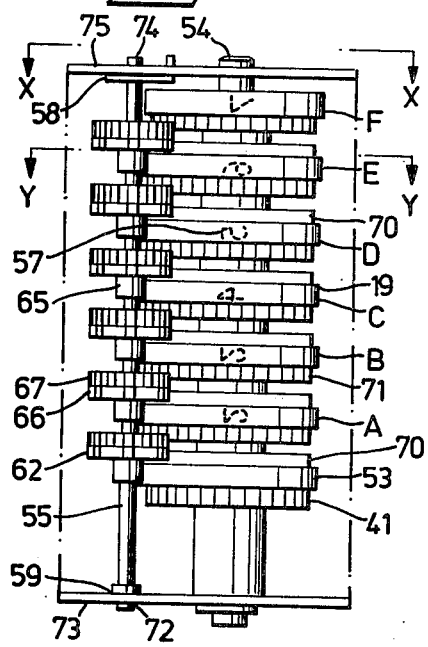
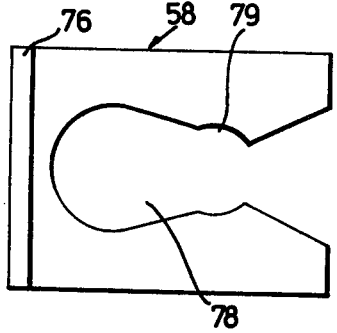
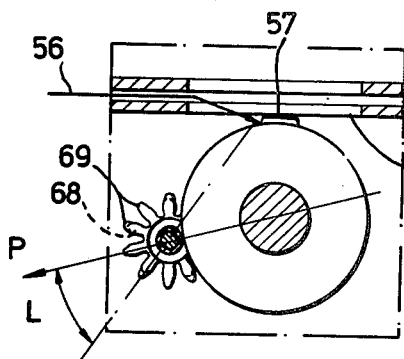
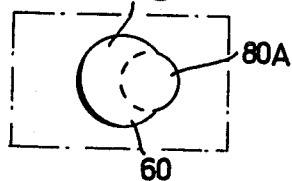
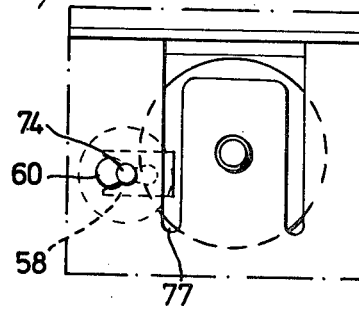
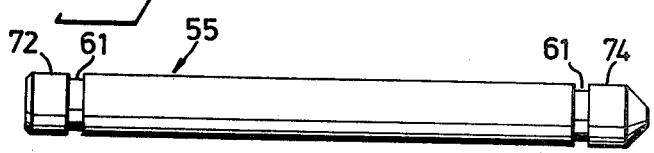

RECORDING DISTANCE MEASURING INSTRUMENT ATTACHED TO A VEHICLE HUB

This is a continuation-in-part application of Ser. No. 612,208, filed Sept. 19, 1976.

BACKGROUND OF THE INVENTION

U.S. patent application Ser. No. 612,208, filed Sept. 10, 1975, relates to a device which is attached to a vehicle hub for recording the distance covered by the vehicle. The device comprises a counting mechanism, a printing mechanism for stamp cards and feed means for advancing the counting mechanism wheels as a function of distance covered. The feed means is driven by an annular pendulum which is concentric with the vehicle wheel axle and is provided with mechanical coupling means, in the form of worm gears and screws on the pendulum axle, connected to the feed means for rotating the counting mechanism wheels.

The feed means for stepped feed of the counting mechanism wheels comprises a feed arm adapted to perform in response to the rotation of the worm gear in an arbitrary direction of rotation, a rocking motion between two stable end positions by action of a snap spring. The end positions are assumed by turning the feed arm by degrees to the dead point of the snap spring, whereafter the snap spring completes said rocking motion to the stable end position.

The counting mechanism wheels are provided with elevated numeral type faces for printing on the stamp cards. Consequently it is possible by inserting insert a thin, suitably bent metal sheet into the card slot and pressing it against an elevated numeral type, to press back the type. The counting mechanism can thus be manipulated to show a distance which is shorter than the actual distance covered by the vehicle.

SUMMARY OF THE INVENTION

It is an object of the present invention to render cheating such devices (distance measuring instruments) impossible. The feed means of the device includes for each pair of numeral type wheels a transfer pinion rotatably mounted on a drive axle in parallel with the counting wheel axle, the pinions of which are arranged between and mesh with wheels of the pair question. The numeral type wheel with higher significance in the pair advances one counting step for each revolution of the numeral type wheel with lower significance. The invention is substantially characterized so that the drive axle at its end located on the same side as the most significant numeral type wheel of the counting mechanism is held by a resilient holding member. The resilient holding member is adapted upon actuation of said axle by at least a radial force exceeding a definite size to yield and release said end. The end then performs a pivotal motion, with the other end of the axle as pivot point, and meshing between at least the most significant numeral type wheels and corresponding transfer pinions is interrupted. The numeral type wheels then perform a stamp print having a disordered integer, including half and smaller parts of the digits whereby improper meddling is easily detected.

A device according to the invention, comprising a usual axle in locking engagement with a groove in the drive axle at one end thereof, is inserted into a normal hole in the frame of the device in order to radially and axially hold said end. The resilient member can be a groove rider engaging with a second groove at the other end of the drive axle, which end is inserted into an oblong hole in the frame of the device. The oblong hole can be formed of two circular hole portions, which partially overlap one another. The first hole has a diameter adjusted to that of the drive axle in order to receive without clearance the axle end, while the second hole portion has a substantially greater diameter in order to receive with greater clearance the axle end after release of the resilient member. The groove rider could also be a sheet metal rider provided with recesses. Each leg of the rider could also have at an intermediate portion of its inner edge an arc-shaped portion, so, that the shape and mutual distance of these two portions are adapted to receive and retain the corresponding axle end to prevent its axial and radial movement. The rider, on its edge opposed to the recess opening, has an upwardly bent portion adapted to engage with a groove in the frame of the device. The elastic properties and dimensions of the rider, as well as the dimensions of the axle groove, are such that upon action on the axle by a radial or axial force exceeding a definite value, the axle end gets out of the engagement with the rider and assumes a radially and axially undefined position in the oblong hole.

BRIEF DESCRIPTION OF THE DRAWINGS

The invention is described in greater detail with reference to an embodiment shown in the accompanying drawings, in which:

FIG. 3A is a top view which shows details of a feed means;

FIG. 3B is a side elevational view taken along lines Y—Y of FIG. 3A;

FIG. 3C is a side elevational view taken along lines X—X of FIG. 3A;

FIG. 4A is a top view of a groove rider shown in FIGS. 3A and 3B;

FIG. 4B is a side view of the groove rider shown in FIG. 3C;

FIG. 5 shows, in enlarged scale, an axle hole for one end of the drive axle carrying the drive wheels for the numeral type wheels; and FIG. 6 shows the drive axle.

DETAILED DESCRIPTION

Figure 1:
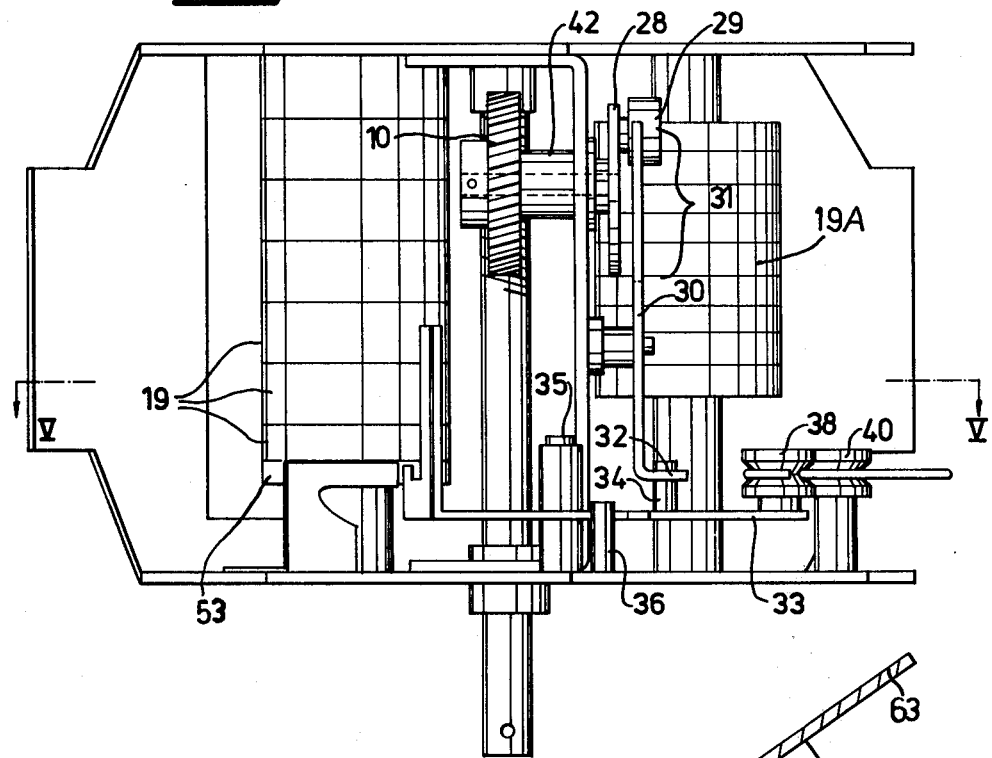
FIG. 1 is a top view illustrating a feed mechanism for the numeral type wheels of a device according to the invention.
Figure 2:
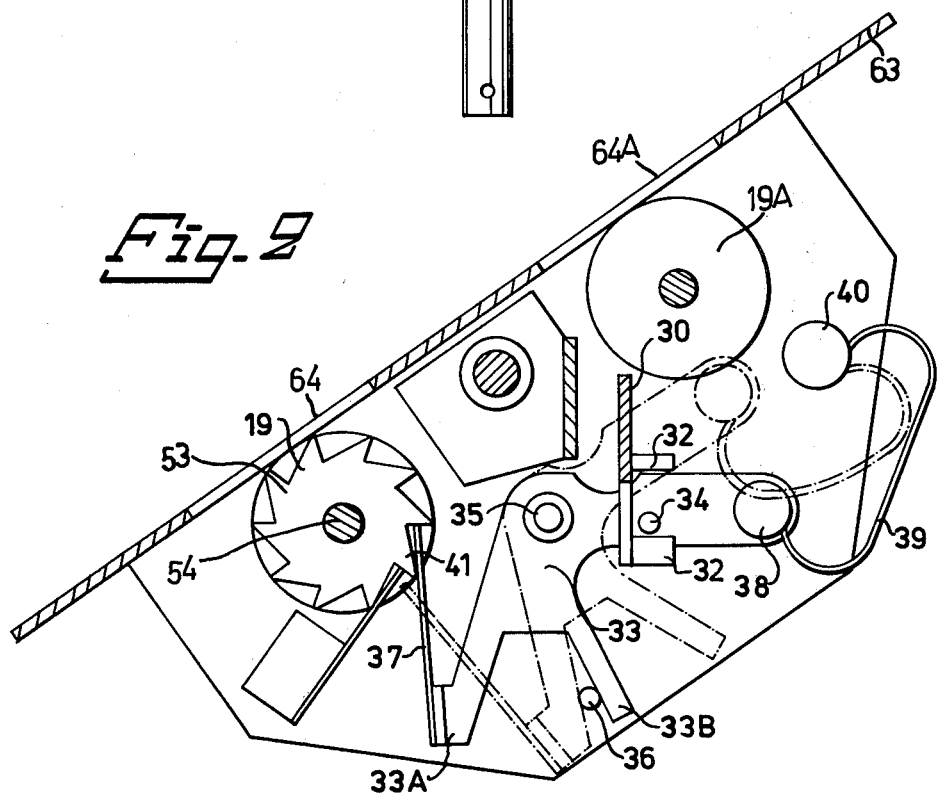
FIG. 2 is a side elevational view taken along lines V—V of FIG. 1.

The feed mechanism for the numeral type wheels of the counting mechanism is described with reference to FIGS. 1 and 2.

The first part of the transfer system for transferring the continuous movement of a worm gear 10 to the numeral wheels 19 consists of a crank mechanism. The axle 42 carrying the worm gear 10 is provided at its opposite end with a plate 28 that is provided with a crank pin 29. The pin 29 actuates a supported crank arm 30 via a groove 31 located in the arm 30 and engaging the pin 29. The crank arm will reciprocatingly rock between its end positions, independently of the rotation direction of the worm gear 10. The crank arm is provided at its end opposite to the groove 31 with outwardly bent dog tips 32, which actuate a feed arm 33 through a stop member 34 riveted on the arm. The feed arm 33 is supported on an axle 35 and can swing between two end positions, which are determined by the contour of the feed arm 33 and by a stop pin 36. On the feed arm 33 are attached a feed spring 37 and a spring support 38. The feed spring 37 actuates a ratchet wheel 53 mounted to the side of the first numeral type wheel 19 and rotates on the counting wheel axle 54.

The feed arm is actuated via the spring support 38 by a snap spring 39, which at one end is suspended in a support 40. The feed arm 33 can assume two stable positions. In a first position shown by dash-dot lines in the drawings a contour arm 33A is against the stop pin 36. The snap spring 39 is tensioned and the feed spring 37 is ready to advance a tooth 41 on the ratchet wheel 53 adjacent the first numeral wheel 19. In the second position, a contour arm 33B rests against the stop pin 36. In this second position, the snap spring 39 is relieved and the tooth 41 has been advanced one position.

By a suitably designed clearance between the dog tips 32 and the stop member 34 (FIG. 2), a forced feed of the feed arm between the two end positions as determined by the stop pin 36 and the contour arms 33A and 33B is obtained. This forced feed is not utilized in normal operation, because the snap spring causes the feed arm be slowly lifted up to the dead position whereafter it snaps over to the stable end position. If for some reason the snap movement is obstructed, for example due to dust or dirt penetration, increased friction or by means introduced improperly in order to brake the wheels, the numeral wheels will still be advanced by force and, thus, measurement of distance covered will continue.

If the numeral wheels are braked to a definite stop, the feed spring 37 will be overloaded and permanently deformed, so that further advancement of the numeral wheels will not take place, not even after the removal of the stop.

The printing on the stamp card is effected from the numeral wheels 19 through an aperture 64 in one wall 63 of the card slot 4 and, respectively, from the numeral type wheels 19A. Wheels 19A are fixedly set and form the apparatus serial number of the device, through an aperture 64A.

As appears most clearly from FIGS. 3A and 3B, the distance counting mechanism comprises numeral type wheels 19, which are rotatably mounted on the axle 54. Transfer pinions 62 rotated on an axle 55 are arranged between the ratchet wheel 53 and the first numeral type wheel A and in continuation between each pair of numeral type wheels A-B, B-C, C-D, D-E and E-F. The types 57 on the numeral type wheels are elevated and during printing act through the aperture 64 (FIG. 3B) on a stamp card inserted into the card slot 4. The numeral wheel axle 54 has a large diameter in order to produce a neat stamp image. The friction moment is then relatively high, but in return the drive axle 55 has a small diameter, so that the friction moments are held down. Each transfer pinion 62 includes a hub 65, a first tooth series 66 of five teeth 68 (shown in dotted lines in FIG. 3B) associated with said hub, and a second tooth series 67 of ten teeth 69 associated with the tooth series 66. The teeth 68 co-operate with a projection, which is provided with a recess and located on the circumference of the portion 70 of the ratchet wheel 53 and, respectively, of the numeral wheels, consequently each pinion 62 is indexed once for each revolution of the next lower significant numeral type wheel and ratchet wheel for successive increasing counting in the counting mechanism. This indexing occurs by meshing the tooth series 67 with the tooth series 71 of the numeral type wheels. The numeral type wheels are graduated 0-9, and in FIG. 3A the number 765422 is shown in position for printing. As indicated above, the wheels 19 in FIG. 3A have the designations A, B, C, D, E and F, respectively, and show maximum values 9, 99, 999, 9999, 99999 and 999999 Km, respectively.

FIG. 3B shows how a person intending to improperly change the number indication of the counting mechanism would probably proceed. By means of a suitably bent metal sheet 56 inserted into the card slot 4 against an elevated numeral 57 this numeral can by force be pressed back so that a lower number indication is obtained. In practice, it is of minor consideration to manipulate the wheels A, B, C which refer to low numbers of kilometers. However, the wheels D, E and F, however, are of great interest and, therefore, their manipulation would be worthwhile to some trying to defeat the counter.

In FIG. 3B two lines are shown intersecting one another in the centre for the drive axle 55. One of these lines extends through the point of engagement of the metal sheet 56 with the numeral type 57, and the other line extends through the centre of the axle 54. These lines form in between themselves a small angle L, and the last mentioned line shows the direction for the force P, which acts on the drive axle 55 and will be relatively great when a relatively moderate force is applied on the metal sheet 56.

In order to prevent the possibility of manipulation of the numeral type wheels, the drive axle 55 springs outward, due to the force P. In other words, its upper end 74 in FIG. 3A swings to the left, with the lower end 72 as centre of rotation. This causes overmeshing wherein, the tooth series 71 on the wheels 19 get out of engagement with the pinions 62. This implies that the wheels 19 are no longer locked by the pinions 62 and, thus, will assume uncontrollable positions.

This is indicated at printing because certain numerals are printed only partially. Consequently, the fraudulent manipulation is directly revealed. Preferably the arrangement is such that the counting mechanism can be restored to a serviceable state only by renovation in a factory or service facility.

More precisely, the condition for the axle 55 to spring outward, is brought about as follows. The axle 55 is provided adjacent to its two ends with an annular groove 61 (FIG. 6). The axle end 72 (FIG. 3A) carries in the groove 61 a normal axle locking member 59 which abuts the side wall 73 of the frame and is inserted into a normal loose fitting hole in said wall. At the other axle end 74 a special groove rider 58 (FIGS. 4A and 4B) is mounted in the groove 61 and rests against the inner surface of the side wall 75. The rider 58 has one end bent upward at 76 (FIG. 4A), to form a flange which is inserted into a groove or slot 77 (FIG. 3C) in the wall 75. As can be seen in FIG. 4B, the rider 58 is provided with a recess or slot 78 of special shape, which has a aperture 79 adapted to fit against the bottom of the groove 61 in the axle 55. The slot 78 diverges and opens away from the flange 76. The longitudinal symmetry line of the recess 78 extends in the rolling direction for the rider sheet metal blank. The hole 60 for the axle 55 in the side wall 75 has a special shape, as shown in FIG. 5. It includes a portion 80A with a diameter adjusted to the diameter of the axle 55. Connected to the portion 80A is a portion 80B with a substantially greater diameter. The shape of the hole 60 is substantially similar to a keyhole, and its outline corresponds substantially to the outer contour of the number 8, in such a manner, that one loop of the number is substantially greater, and the loops are pressed one into the other. The normal position of the axle end 74, rider 58 and hole 60 is shown in FIG. 3C. The end 74 then is located clamped by the rider 58 in the smaller portion 80A of the hole 60.

When one presses with the metal sheet 56 against the type 57, as shown in FIG. 3B, the force of engagement of the rider 58 with the axle 55 is overcome by the relatively great force P, so that the axle end 74 will snap out of the rider 58 and thereby be moved into the larger portion 80B of the hole 60 and the other end 72 of the axle pivots slightly within the loose-fitting hole in the wall which supports it. Consequently at least the wheels D, E, F are disengaged from the corresponding pinions 62, as described above, and the improper meddling is inexorably revealed.

The locking force of the groove rider 58 against the axle 55, of course, is adjusted so that the axle 55 cannot snap outward due to impacts and shocks which occur during normal use of the distance measuring device. Upon mounting, the axle 55 is inserted into the hole 79, in which connection the groove rider 58 is not subjected to any deforming forces. The groove rider, further, is so designed that a relatively small radial movement of the axle 55 causes the axle to snap out of engagement with the groove rider. The rigidness of the rider 58 is such that a small outward bending of the rider legs is required for snapping out while, the desired locking force at normal operation of the measuring instrument is maintained.

The device shown can be modified in different ways within the scope of the claims.

I claim:

1. In a counting apparatus wherein the counting apparatus includes: a succession of independently rotatable coaxial, counting wheels each having a series of indicia thereon which, as the wheels rotate, are registered sequentially with a printing station; indexing means disposed between and meshing with each pair of wheels wherein the indexing means include means between preceding and succeeding wheels wherein each succeeding wheel advances one step for each revolution of the preceding wheel so that a higher number is registered with the printing station, and wherein the numbers of each succeeding wheel are more significant than the numbers of the preceding wheel, the improvement comprising:

a frame having an opening with a portion which forms a first bearing surface;
an axle for mounting the indexing means;
means for mounting the axle on the frame and in contact with the first bearing surface to extend parallel to the axis of the counting wheels, the mounting means including:
a rider attached to the frame having an aperture forming resilient partial bearing surfaces contacting the axle, said aperture adjacent a diverging section aligned with the opening in the frame, said rider releasably securing one end of the axle within the bearing surfaces so that when a force is applied to the counting wheels the counting wheels will impart a radial force to the indexing means causing the one end of the axle to disconnect from the bearing surfaces and relocate within the diverging section and the opening so that the indexing means is inoperative to further index the counting wheels.

2. The apparatus of claim 1 wherein the indicia are raised type faces adapted to print on cards and wherein when a tangential force is applied to the type face the numeral wheel rotates and contacts the indexing means to laterally displace the axle.

3. The counting apparatus of claim 2 wherein the axle is pivotally mounted at the end adjacent the least significant digit of the counting wheels and is releasably secured at the other end adjacent the most significant digits of the counting wheel.

4. The apparatus of claim 2 wherein the rider is mounted on a side of the frame and the opening in the frame is defined by a relatively wide area and a relatively narrow area forming the first bearing surface, wherein the narrow area has a segment corresponding in curvature to the surface of the axle;
wherein a groove is provided in the axle and has a diameter less than the axle; and
wherein said rider is a resilient clip engageable in the groove and positioned to hold the axle releasably in the narrow portion of the opening.

5. The apparatus of claim 4 wherein the frame includes a slot therein spaced from the opening and wherein the resilient clip has a flange extending normally therefrom which projects through the slot to hold the clip in place on the frame as long as the clip is engaged in the groove on the axle.

* * * * *